Figure 1:
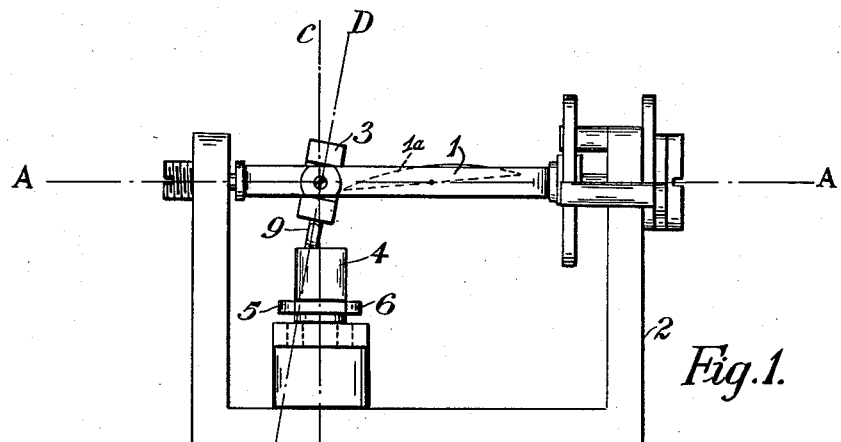

July 18, 1933. G. W. WALTON 1,918,358
SCANNING DEVICE FOR TELEVISION AND THE LIKE
Filed March 10, 1932

Inventor
George W. Walton

Patented July 18, 1933

1,918,358

UNITED STATES PATENT OFFICE

GEORGE WILLIAM WALTON, OF LONDON, ENGLAND

SCANNING DEVICE FOR TELEVISION AND THE LIKE

Application filed March 10, 1932, Serial No. 598,075, and in Great Britain February 19, 1931.

This invention relates to scanning devices for television, picture telegraphy and the like, and is particularly concerned with scanning devices comprising oscillating mirrors.

It is an object of the present invention to provide an oscillating mirror of ample size, which requires very small power to drive it and which is operated in such a manner that its amplitude of swing is constant whatever may be the driving power applied, in excess of a predetermined minimum.

Hitherto scanning devices of the oscillatory type have usually been of the well known oscillograph type. The normal oscillograph has many disadvantages when used as a scanning device, for the mirror is of very small area, and the moving system is tuned to a very high frequency of natural oscillation in order that it may more accurately follow the wave form of the operating currents. A further disadvantage is that the amplitude of swing is not constant, but is dependent on the energy input, and, as in television the energy input may vary considerably, the change in amplitude of the swing of the mirror causes distortion of the picture, and there is a possibility of the received picture being utterly different from the transmitted picture. These features of the usual oscillograph are such as to render it quite unsuitable for scanning a so-called one dimensional picture, such as is described in the specifications of U. S. patent applications Serial Numbers 400,883 and 426,344.

According to the present invention a scanning device for television, picture transmission and the like purposes comprises a mirror mounted for vibration about a fixed axis and continuously rotatable means for vibrating the mirror at a fixed amplitude.

The mechanical coupling between the mirror and the rotatable means is preferably of such nature that uniform rotary motion of said rotatable means produces simple harmonic motion of a spot of light reflected by said mirror on a plane surface. The coupling according to this feature of the invention is thus distinguished from known couplings embodying a simple crank and connecting rod because, as is well known, the motion transmitted by such couplings is not simple harmonic due to obliquity of the connecting rod.

Preferably the mirror forms part of a tuned oscillatory system having a natural frequency equal to the frequency at which the mirror is to be vibrated. The constants of the oscillatory system may be so chosen that the rotation of the rotatable member in response to sinusoidal alternating current is other than uniform and the wave form of the motion of the mirror can thus be made to approximate to a saw tooth shape.

Figure 2:
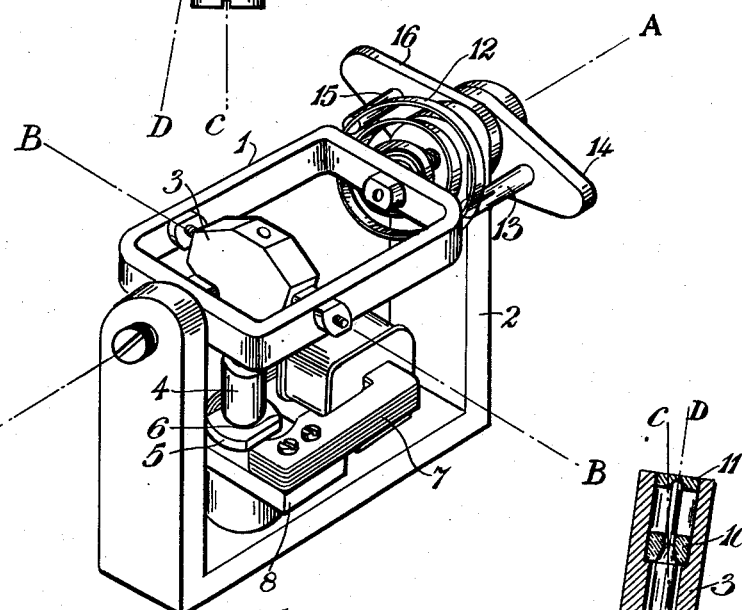
Figure 3:
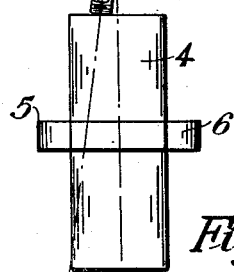
Figure 4:
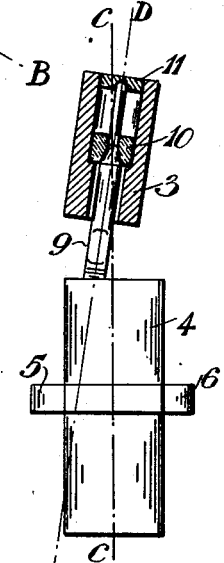

The invention will be described by way of example with reference to the accompanying drawing, in which:

Fig. 1 is a view in side elevation of one embodiment of the present invention, with a portion removed, Fig. 2 is a perspective view of the device of Fig. 1 with the mirror removed, Fig. 3 is a part sectional view of a detail of the device in Figs. 1 and 2, and Fig. 4 shows a modification of the detail of Fig. 3.

Referring to the drawing, a mirror frame 1 is pivotally mounted upon a base member 2 so as to be vibratable about an axis A—A. The mirror 1a which is attached to the frame 1 is, in the example illustrated, a plano-convex lens having the plane surface silvered. Other forms of mirror can, of course, be used, and preferably the reflecting surface of the mirror is disposed substantially in the axis A—A. In Fig. 1 the reflecting surface is inclined at a small angle with respect to the line A—A.

A rocker member 3 is pivotally mounted upon the mirror frame 1 so as to be free to vibrate relatively to the mirror frame about an axis B—B. The rocker member pivots are so placed that the axis B—B is at right angles to and intersects the axis A—A. Rotatably mounted on the base member 2 is an armature 4. The magnetically operative portion of the armature is in the form of a disc having two flats, the unflattened portions constituting two symmetrically arranged poles 5 and 6. The armature is disposed between the two poles of an electromagnet 7 which is secured to a platform 8. The platform 8 may, for the purpose of adjustment, be made rotatable about the axis of rotation of the armature which is indicated by C—C. The armature may be of soft iron or it may be a permanent magnet.

The pivots which determine the axes A—A and B—B and also the bearings on which the armature rotates are preferably jewelled.

The coupling between the rocker member 3 and the armature 4 is shown most clearly in Fig. 3. An eccentric pin 9 is screwed into the armature, the axis D—D of the pin being inclined (at say 15° for example) to the axis C—C. The pin seats upon a jewel 10 in the rocker member 3. Preferably, as shown in the modification of Fig. 4, a second jewel 11 is provided to ensure that the position of the axis of rotation of the pin 9 shall remain fixed relative to the rocker member 3.

The intersection of the axes C—C and D—D is made to coincide with the intersection of the axes A—A and B—B, and the axis D—D is arranged to be at right angles to the axis B—B. To enable these points of intersection to be adjusted the mirror frame and rocker member are made adjustable along their axes A—A and B—B respectively. In addition, the armature 4 is made adjustable in height, that is to say along the axis C—C. The pin 9 may also be screwed more or less into the armature 4.

A spiral spring 12 is connected at its centre to the mirror frame 1 and at its outer end to a pin 13 fixed to a lever 14 which is pivotally mounted on the base member 2 and which can be moved around the axis A—A for the purpose of adjusting the position of rest of the mirror and the position of zero spring tension in relation to the position of the armature 4 about its axis. A pin 15 mounted on the pivoted lever 16 engages the spring 12 slidably and serves for adjusting the free length and therefore the stiffness of the spring, as in the case of a watch hair spring.

The method of operation is as follows:—

The setting of the lever 14 is such that the armature 4 does not come to rest with its poles 5 and 6 at dead centre with respect to the electromagnet poles. When an alternating current is passed through the winding of the electromagnet, the armature commences to oscillate about the axis C—C. If the frequency of the alternating current is equal to the resonant frequency of the mechanical oscillatory system, constituted by the effective mass of the mirror and the parts connected thereto and the compliance of the spring 12, the oscillations will build up and when an amplitude of 180° is reached the armature will commence to rotate in synchronism with the applied alternating current. Any slight errors in tuning can be corrected by moving the lever 16.

As the angle of the spindle is constant it is obvious that the amplitude of the oscillation of the mirror frame will be constant so long as the armature is revolving, even if the applied electrical currents vary very considerably. The limiting point for constant amplitude vibration is that at which the applied energy is equal to the losses in the device, which consist of course of the electrical, magnetic and mechanical losses. When the applied electrical energy falls below this value then the armature ceases to rotate and takes up an oscillation of an amplitude corresponding to the applied energy. Energies above this critical point, even when many times greater than what is required to operate the device will not cause any change in the amplitude of the mirror swing, nor will the speed of movement of the mirror be varied other than sinusoidally.

The energy required to operate such a device is very small, for friction is reduced to a minimum by means of the jewelled bearings. In order that the phase of the mirror oscillations shall bear the correct relation, for example to the picture impulses, the poles and magnetic circuit may be adjusted by rotating the platform 8 about the axis C—C. When the picture impulses are in fixed phase relation to the synchronizing impulses, for example when these two sets of impulses are mixed together, this adjustment only requires to be made once, and allows for any phase change in the operating currents between the television transmitter and receiver, due to the various inductive and capacitative devices employed in the two sets of apparatus.

With the form of coupling described, uniform rotation of the armature 4 will cause the tangent of the angle of displacement of the mirror from its means position to vary in a simple harmonic manner so that there is produced simple harmonic motion of a spot of light reflected by said mirror onto a plane surface and for some purposes this may be the most desirable form of vibration for the mirror. In using the device for example for reproducing a television image of the so-called one dimensional kind, as described in my specifications of U. S. patent applications Serial Numbers 400,883 and 426,344, however, the effect may be to produce brighter illumination of the edges of the image than of the centre. Unless some form of aperture is used between the mirror and the reproducing screen to correct this, it is advisable to have a mirror motion which approximates to a saw tooth wave form, that is to say the mirror should be moved in such a way that a spot of light reflected therefrom moves across a plane surface at approximately constant velocity. This can be done by suitably adjusting the position of the pin 9 about the axis C—C in relation to the position of the armature poles 5 and 6 so that the armature tends to "hunt". That is to say the armature motion is a combination of a rotary motion and an oscillatory motion of the same frequency as the mirror vibration but approximately 90° out of phase with the mirror vibration. The effect can, of course, be obtained by rotating the platform 8 about the axis C—C.

The axes A—A and B—B should preferably be made to pass substantially through the centres of gravity of the respective parts which oscillate about them.

Clearly, if desired, the mirror frame may be provided with springs at each end instead of only at one end as already described. The synchronous motor 4, 7 may of course have other forms and other numbers of poles.

When the device is used to scan a one dimensional picture it has very many advantages. First, owing to the fact that in order to produce 20 pictures per second the mirror only requires to vibrate about one fixed axis at 10 cycles per second, the area of the mirror can be relatively large and the amount of light reflected by it can also be great. The energy required to operate the device is small, and the received picture is automatically phased and synchronised without any adjustment.

It must be understood that the invention is not limited to the particular form described, for many other arrangements can be used within the scope of the present invention.

I claim:

1. A scanning device for television, picture transmission and the like purposes, comprising a mirror mounted for vibration about an axis in fixed relation thereto, a member continuously rotatable about an axis and adapted to set said mirror in vibration and a mechanical coupling between said mirror and said member, said coupling comprising, upon said member, a pin adapted to move in a conical path around the axis of rotation of said member.

2. A scanning device for television, picture transmission and the like purposes, comprising a mirror mounted for vibration about an axis in fixed relation thereto, a continuously rotatable member for maintaining the amplitude of the mirror vibrations constant, and means for producing simple harmonic variations in the tangent of the angle of displacement of said mirror upon uniform rotary motion of said rotatable member, said means including a mechanical coupling positioned between said mirror and said rotatable member.

3. A scanning device for television, picture transmission and the like purposes, comprising a fixed member, a mirror mounted for vibration relatively to said fixed member about a fixed axis, a rocker member mounted for vibration relatively to said mirror about a second axis and a member continuously rotatable about a third axis, mechanically coupled to said rocker member, and adapted to set said rocker member and said mirror in vibration about their respective axes, said axes intersecting one another substantially at right angles and at a single point.

4. A scanning device for television, picture transmission and the like purposes comprising a fixed member, a mirror mounted for vibration relatively to said fixed member about an axis which is fixed in position in relation to both said mirror and said fixed member, a rocker member mounted for vibration relatively to said mirror about a second axis and a member continuously rotatable about a third axis, mechanically coupled to said rocker member and adapted to set said rocker member and said mirror in vibration about their respective axes, said three axes intersecting one another substantially at a single point.

5. A scanning device for television, picture transmission and the like purposes comprising a fixed member, a mirror mounted for vibration relatively to said fixed member about an axis which is fixed in position in relation to both said mirror and said fixed member, a rocker member mounted for vibration relatively to said mirror about a second axis and a member continuously rotatable about a third axis mechanically coupled to said rocker member and adapted to set said rocker member and said mirror in vibration about their respective axes, said three axes being substantially at right angles to one another.

6. A scanning device for television, picture transmission and the like purposes comprising a fixed member, a mirror mounted for vibration relatively to said fixed member about an axis which is fixed in position in relation to both said mirror and said fixed member, a rocker member mounted for vibration relatively to said mirror about a second axis, a bearing in said rocker member, a member continuously rotatable about a third axis and a pin fixed to said continuously rotatable member at a point eccentric of said third axis and engaging rotatably in said bearing, said pin being inclined with respect to said third axis.

7. A scanning device for television, picture transmission and the like purposes, comprising a mirror mounted for vibration about an axis in fixed relation thereto, a continuously rotatable member for maintaining the amplitude of the mirror vibrations constant, means for producing simple harmonic variations in the tangent of the angle of displacement of said mirror upon uniform rotary motion of said rotatable member, and a compliance element associated with said mirror, said mirror and compliance element forming parts of a mechanical vibratory system having, in respect of vibrations about said axis, a natural frequency substantially equal to the frequency at which said mirror is vibrated for scanning purposes.

8. A scanning device for television, picture transmission and the like purposes, comprising a fixed member, a mirror mounted for vibration relatively to said fixed member about a fixed axis, a rocker member mounted for vibration relatively to said mirror about a second axis, a member continuously rotatable about a third axis, mechanically coupled to said rocker member, and adapted to set said rocker member and said mirror in vibration about their respective axes, said axes intersecting one another substantially at right angles and at a single point, and a compliance element associated with said mirror, said mirror and compliance element forming parts of a mechanical vibratory system having, in respect of vibrations about said axis, a natural frequency substantially equal to the frequency at which said mirror is vibrated for scanning purposes.

GEORGE WILLIAM WALTON.